(12) United States Patent
Uenoyama et al.

(10) Patent No.: US 11,952,048 B2
(45) Date of Patent: Apr. 9, 2024

(54) INFORMATION PROCESSING DEVICE, CONTROL DEVICE, VEHICLE, AND SPRINKLING METHOD

(71) Applicant: TOYOTA JIDOSHA KABUSHIKI KAISHA, Toyota (JP)

(72) Inventors: Naoki Uenoyama, Nagoya (JP); Koichi Suzuki, Nagoya (JP); Ryo Kamimura, Shizuoka-ken (JP); Daisuke Nakata, Seto (JP); Yuki Tatsumoto, Nagoya (JP); Yusuke Futakuchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 359 days.

(21) Appl. No.: 17/215,701

(22) Filed: Mar. 29, 2021

(65) Prior Publication Data

US 2021/0339805 A1   Nov. 4, 2021

(30) Foreign Application Priority Data

Apr. 30, 2020  (JP) .................................. 2020-080719

(51) Int. Cl.
  *B62D 25/24*   (2006.01)
  *B60W 60/00*   (2020.01)

(52) U.S. Cl.
  CPC ........... *B62D 25/24* (2013.01); *B60W 60/001* (2020.02)

(58) Field of Classification Search
  None
  See application file for complete search history.

(56) References Cited

U.S. PATENT DOCUMENTS

| | | |
|---|---|---|
| 2006/0068240 A1 | 3/2006 | Matoba |
| 2019/0217864 A1* | 7/2019 | Kusukame ......... G01C 21/3691 |
| 2019/0221871 A1* | 7/2019 | Rovik ..................... B60L 50/72 |
| 2020/0289697 A1* | 9/2020 | Ando ........................ A61L 9/16 |
| 2021/0188430 A1* | 6/2021 | Kisiler ................. G08G 5/0043 |

FOREIGN PATENT DOCUMENTS

| | | | | |
|---|---|---|---|---|
| CN | 108388153 A | * | 8/2018 | ............. G05B 19/04 |
| CN | 109610396 A | * | 4/2019 | ............... E01H 3/02 |
| DE | 10 2017 218 613 A1 | | 6/2018 | |
| JP | 2006-099994 A | | 4/2006 | |
| JP | 2019-001305 A | | 1/2019 | |
| JP | 2019-19506 A | | 2/2019 | |
| JP | 6877275 B2 | * | 5/2021 | |

* cited by examiner

*Primary Examiner* — Hunter B Lonsberry
*Assistant Examiner* — Paysun Wu
(74) *Attorney, Agent, or Firm* — Sughrue Mion, PLLC (57) ABSTRACT

An information processing device includes a communication unit and a control unit. The control unit is configured to determine a sprinkling mode based on information indicating the environment of a sprinkling place. The control unit is configured to send, through the communication unit, a notification indicating the sprinkling mode to at least one vehicle scheduled to travel in the sprinkling place.

6 Claims, 3 Drawing Sheets

INFORMATION PROCESSING DEVICE, CONTROL DEVICE, VEHICLE, AND SPRINKLING METHOD

INCORPORATION BY REFERENCE

The disclosure of Japanese Patent Application No. 2020-080719 filed on Apr. 30, 2020 including the specification, drawings and abstract is incorporated herein by reference in its entirety.

BACKGROUND

1. Technical Field

The present disclosure relates to an information processing device, a control device, a vehicle, and a sprinkling method.

2. Description of Related Art

Conventionally, an in-vehicle fuel cell system is known that performs control so that, when the condition of the road surface directly under a vehicle is estimated to be a predetermined road surface condition, liquid water is not discharged to the outside of the vehicle (for example, Japanese Unexamined Patent Application Publication No. 2006-99994 (JP 2006-99994 A)).

SUMMARY

In the conventional system, there is room for improvement on water discharging from a vehicle to the outside. For example, in the conventional system, no study has been made on the discharge water sprinkling mode.

The present disclosure improves the external environment by discharging water from a vehicle.

A first aspect of the present disclosure relates to an information processing device including a communication unit and a control unit. The control unit is configured to determine a sprinkling mode based on the information indicating the environment of a sprinkling place and to send, through the communication unit, a notification indicating the sprinkling mode to at least one vehicle scheduled to travel in the sprinkling place.

A second aspect of the present disclosure relates to a control device including a control unit. The control unit is configured to cause a sprinkling device to sprinkle discharge water at a sprinkling place, using a sprinkling mode determined based on the information indicating the environment of the sprinkling place.

A third aspect of the present disclosure relates to a sprinkling method including determining, by an information processing device, a sprinkling mode based on the information indicating the environment of a sprinkling place and sprinkling, by at least one vehicle, discharge water at the sprinkling place using the sprinkling mode.

According to the present disclosure, the external environment of a vehicle can be improved by discharging water from the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings. The same components shown in the drawing below are designated by the same reference numerals.

System Configuration

Figure 1:
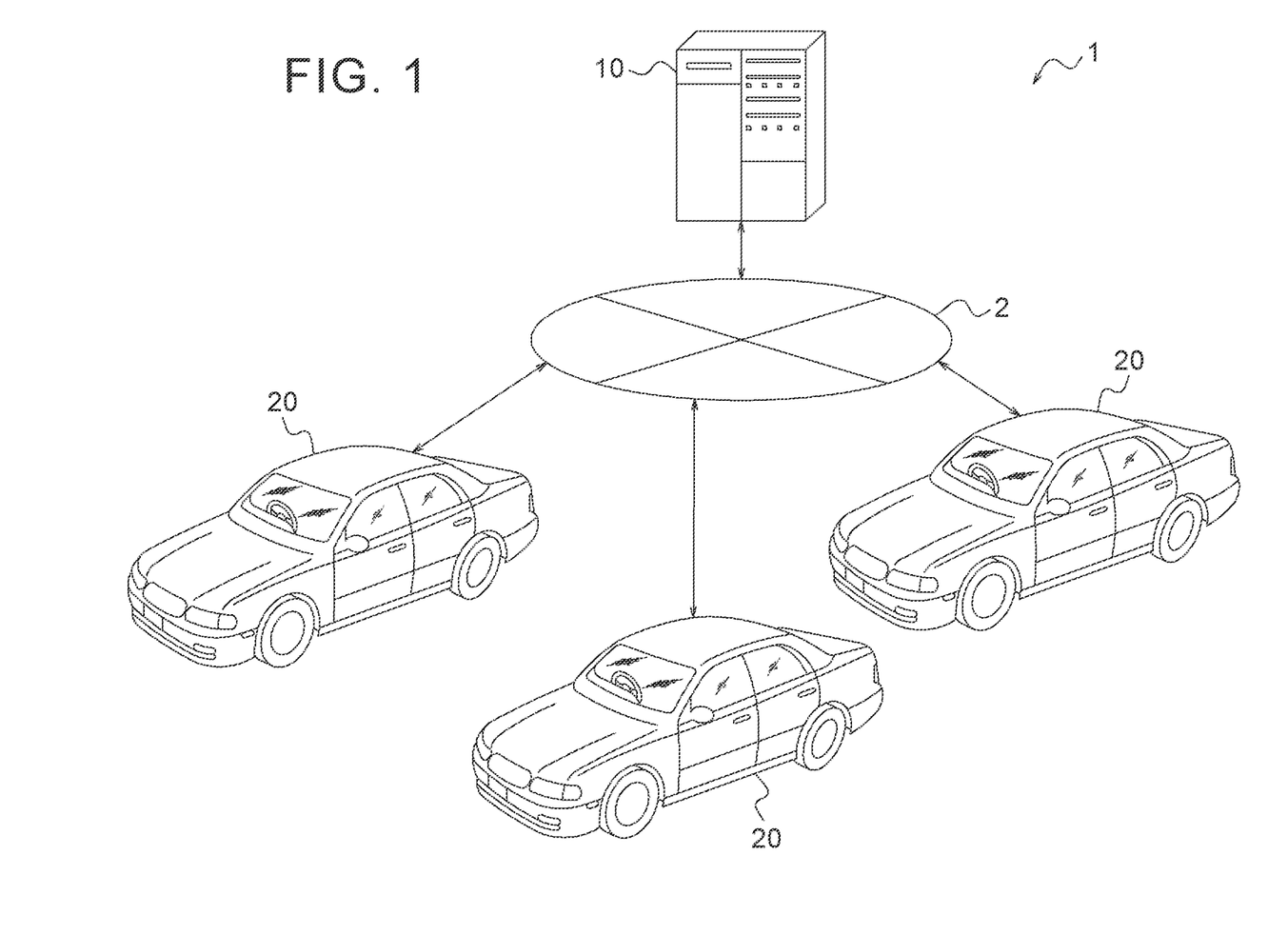
FIG. 1 is a diagram showing a configuration of a sprinkling system according to one embodiment of the present disclosure.

As shown in FIG. 1, a sprinkling system 1 according to one embodiment of the present disclosure includes an information processing device 10 and at least one vehicle 20. According to the sprinkling system 1, the discharge water of the vehicle 20 is sprinkled at a sprinkling place determined by the information processing device 10.

The information processing device 10 and the vehicle 20 can communicate with each other via a network 2. The network 2 may be any network including a mobile communication network and the Internet.

The information processing device 10 may be any server. The information processing device 10 may be a rental server that provides the vehicle rental service. The vehicle rental service may be a service for leasing or renting vehicles such as a fuel cell vehicle (FCV), or a service for providing the car sharing service. The information processing device 10 may be a vehicle dispatch server that provides the vehicle dispatch service. The vehicle dispatch service may be a service for dispatching a car to a place designated by the user. The information processing device 10 may be a delivery server that provides the delivery service. The delivery service may be a service for delivering parcels.

The information processing device 10 may be a dedicated computer, a general-purpose personal computer, or a cloud computing system configured to function as a server.

The vehicle 20 may be any type of car. The vehicle 20 is, for example, a gasoline vehicle, a diesel vehicle, a hybrid vehicle (HV), a plug-in hybrid vehicle (PHV), an electric vehicle (EV), or an FCV. The vehicle 20 may be driven by a driver. The vehicle 20 may also be driven autonomously at any autonomous driving level. For example, the autonomous driving level is one of levels 1 to 5 defined by the Society of Automotive Engineers (SAE). The vehicle 20 may be a Mobility as a Service (MaaS) dedicated vehicle.

When the information processing device 10 is a rental server, the vehicle 20 may be operated as a rental vehicle. When the information processing device 10 is a rental server that provides the lease or rental service of an FCV, the vehicle 20 may be an FCV used for the lease or rental service. When the information processing device 10 is a rental server that provides the car sharing service, the vehicle 20 may be operated as a shared vehicle in the car sharing service. When the information processing device 10 is a vehicle dispatch server, the vehicle 20 may be operated as a taxi in the vehicle dispatch service. When the information processing device 10 is a delivery server, the vehicle 20 may be operated as a delivery vehicle in the delivery service. When the vehicle 20 is a delivery vehicle, the vehicle 20 may be driven at any autonomous driving level.

Figure 2:
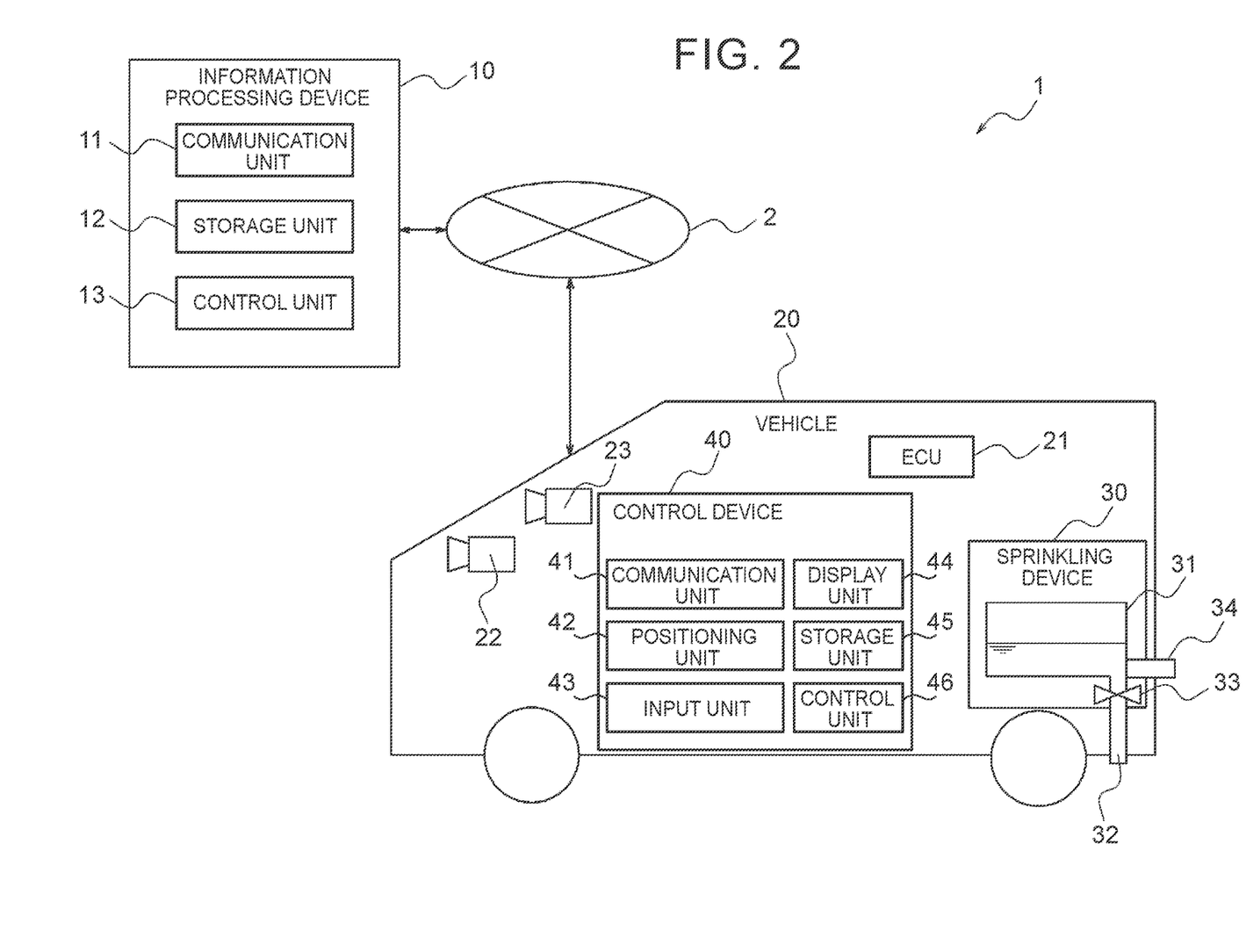
FIG. 2 is a block diagram showing a detailed configuration of the sprinkling system shown in FIG. 1.

As shown in FIG. 2, the information processing device 10 includes a communication unit 11, a storage unit 12, and a control unit 13.

The communication unit 11 may be configured to include at least one communication module that can be connected to the network 2. For example, the communication module is a module that supports standards such as the wired local area network (LAN) standard or the wireless LAN standard. The communication unit 11 may be connected to the network 2 through the communication module via the wired LAN or the wireless LAN.

The storage unit 12 may be configured to include at least one semiconductor memory, at least one magnetic memory, at least one optical memory, or a combination of at least two types of these memories. The semiconductor memory is, for example, a random access memory (RAM) or a read only memory (ROM). The RAM is, for example, a static random access memory (SRAM) or a dynamic random access memory (DRAM). The ROM is, for example, an electrically erasable programmable read only memory (EEPROM). The storage unit 12 may function as a main storage device, an auxiliary storage device, or a cache memory. The storage unit 12 stores data used for the operation of the information processing device 10 and data obtained by the operation of the information processing device 10.

The control unit 13 may be configured to include at least one processor, at least one dedicated circuit, or a combination of them. The processor is a general-purpose processor such as a central processing unit (CPU) or a graphics processing unit (GPU) or is a dedicated processor specialized for specific processing. The dedicated circuit is, for example, a field-programmable gate array (FPGA) or an application specific integrated circuit (ASIC). The control unit 13 can perform the processing related to the operation of the information processing device 10 while controlling the components of the information processing device 10.

The function of the information processing device 10 can be implemented by causing the processor, corresponding to the control unit 13, to execute the information processing program according to this embodiment. That is, the functions of the information processing device 10 can be implemented by software. The information processing program can cause the computer to function as the information processing device 10 by causing the computer to perform the operation of the information processing device 10. That is, the computer can function as the information processing device 10 by performing the operation of the information processing device 10 according to the information processing program.

In the present disclosure, the "program" can be recorded on a computer-readable non-transitory recording medium. The computer-readable non-transitory recording medium is, for example, a magnetic recording device, an optical disc, an optical magnetic recording medium, or a ROM. A program can be distributed, for example, by selling, transferring, or renting a portable recording medium such as a digital versatile disc (DVD) or a compact disc read only memory (CD-ROM) in which the program is recorded. A program may also be stored in the storage of the server. A program stored in the storage of the server may be transferred to another computer for distribution. A program may be provided as a program product.

In the present disclosure, the "computer" can store a program, recorded on a portable recording medium, or a program, transferred from a server, once in the main storage device. In addition, the computer may cause the processor to read a program from the main storage device and then causes the processor to perform processing according to the program that has been read. The computer may also read a program directly from a portable recording medium and then perform processing according to the program. In addition, each time a program is transferred from a server to the computer, the computer may sequentially perform processing according to the program that has been received. The computer may also perform processing by the so-called application-service-provider (ASP) type service in which, instead of transferring a program from a server to the computer, the function is implemented simply by sending the execution instruction and then by acquiring the result. The program mentioned above includes the information that is used for processing by the electronic computer and is equivalent to a program. For example, data that is not a command directly causing the computer to perform processing but has a property of defining the processing of the computer falls under the "information equivalent to a program."

A part of or all of the functions of the information processing device 10 may be implemented by a dedicated circuit corresponding to the control unit 13. That is, a part or all of the functions of the information processing device 10 may be implemented by hardware.

Sprinkling Mode Determination Processing

The control unit 13 determines the sprinkling mode based on the information indicating the environment of a sprinkling place. The sprinkling place is a place where the discharge water of the vehicle 20 is sprinkled, as will be described below. The sprinkling place may be on the surface of a road on which the vehicle 20 can travel. Sprinkling places may be set in advance or may be appropriately determined by a local government, etc. When sprinkling places are appropriately determined by an organization such as a local government, the control unit 13 may receive the information on the locations of sprinkling places, determined by the local government, from an external server of the local government through the communication unit 11 via the network 2.

The sprinkling mode is a mode in which the vehicle 20 sprinkles discharge water. Examples of the sprinkling mode include a spraying mode and a dripping mode as will be described later. When the sprinkling mode is determined based on the information indicating the environment of a sprinkling place, the external environment can be improved as will be described later. The information indicating the environment of a sprinkling place may be used for determining the sprinkling mode that can improve the external environment. The following describes the information indicating the environment of a sprinkling place and examples of processing for determining the sprinkling mode.

First Example

The information indicating the environment of a sprinkling place may include the information indicating the outside air temperature around the sprinkling place. In this example, when the outside air temperature around the sprinkling place is higher than a first temperature threshold value, the control unit 13 may determine that the sprinkling mode is the spraying mode. The spraying mode is a mode that causes the vehicle 20 to spray discharge water as mist-like water. The control unit 13 may receive the information indicating the outside air temperature around the sprinkling place from a thermometer, installed around the sprinkling place, through the communication unit 11 via the network 2. The control unit 13 may also receive the weather information from an external server, through the communication unit 11 via the network 2, to acquire the information indicating the outside air temperature around the sprinkling place. The external server may be any server that provides the weather information. The weather information may be, for example, the weather information observed or predicted in a preset area. The control unit 13 may also estimate the outside air temperature around the sprinkling place by analyzing the position information on the vehicle 20, received from at least one of the vehicles 20 through the communication unit 11 via the network 2, and the thermal image data generated by the vehicle 20.

The first temperature threshold value may be appropriately set, based on an increase in the outside air temperature, for example, in a summer daytime. For example, the first temperature threshold value is the average value of the outside air temperatures in a summer daytime in fine weather. The first temperature threshold value may also be appropriately set based on the load of the outside-air heat on the human body. For example, the first temperature threshold value is the average value of body temperatures.

When the outside air temperature around the sprinkling place is higher than the first temperature threshold value, the control unit 13 determines that the sprinkling mode is the spraying mode. As a result, mist-like discharge water can be sprayed from the vehicle 20 at the sprinkling place. The mist-like discharge water sprayed from the vehicle 20 in this way can absorb heat from the outside air around the sprinkling place and then evaporate into the air. This configuration therefore can decrease the outside air temperature around the sprinkling place. A decrease in the outside air temperature around the sprinkling place can reduce the possibility that pedestrians, etc. near the sprinkling place will feel uncomfortable due to the heat. That is, when it is determined that the sprinkling mode is the spraying mode, the external environment can be improved.

Second Example

The information indicating the environment of a sprinkling place may include the information indicating the surface temperature of the sprinkling place. In this example, when the surface temperature of the sprinkling place is higher than a second temperature threshold value, the control unit 13 may determine that the sprinkling mode is the dripping mode. The dripping mode is a mode that causes the vehicle 20 to drip discharge water onto the road surface. The control unit 13 may estimate the surface temperature of the sprinkling place by analyzing the position information on the vehicle 20, received from at least one of the vehicles 20 through the communication unit 11 via the network 2, and the thermal image data on the road surface generated by the vehicle 20.

The second temperature threshold value may be appropriately set, based on an increase in the road surface temperature, for example, in a summer daytime. For example, the second temperature threshold value is the average value of the road surface temperatures in a summer daytime in fine weather. The second temperature threshold value may be appropriately determined based on the durability temperature of the road surface pavement material. For example, the second temperature threshold value is equal to or lower than the durability temperature of the road surface pavement material.

When the surface temperature of the sprinkling place is higher than the second temperature threshold value, the control unit 13 determines that the sprinkling mode is the dripping mode. As a result, the discharge water can be dripped from the vehicle 20 onto the road surface that is the sprinkling place. The discharge water dripped on the road surface, which is the sprinkling place, can absorb heat from the road surface and then evaporate into the air. The discharge water dripped on the road surface absorbs heat from the road surface and evaporates into the air in this way, with the possibility that the temperature of the road surface is decreased. A decrease in the temperature of the road surface can reduce the possibility that pedestrians etc. near the sprinkling place will feel uncomfortable due to the heat and, in addition, delays the deterioration in the pavement material on the road surface. That is, when it is determined that the sprinkling mode is the dripping mode, the external environment can be improved.

Third Example

The control unit 13 may determine that the sprinkling mode is mode A when the information indicating the environment of a sprinkling place includes the information indicating the outside air temperature around the sprinkling place and when the outside air temperature around the sprinkling place is lower than a third temperature threshold value. Mode A is a mode that causes the vehicle 20 to drip the discharge water with a temperature equal to or higher than a preset temperature onto the road surface. The set temperature may be equal to or higher than the third temperature threshold value. The set temperature may be appropriately determined according to the structure of the battery or the motor of the vehicle 20, as will be described later. The control unit 13 may acquire the information indicating the outside air temperature around the sprinkling place in the same manner as in the first example.

The third temperature threshold value may be appropriately set based on the outside air temperature that causes the road surface to freeze. The third temperature threshold value may be appropriately set based on a temperature such as the freezing point of water. For example, the third temperature threshold value is a value equal to or lower than the freezing point of water.

When the outside air temperature around the sprinkling place is lower than the third temperature threshold value, the control unit 13 determines that the sprinkling mode is mode A. As a result, discharge water with a temperature equal to or higher than the set temperature can be sprinkled from the vehicle 20 at the sprinkling place. Sprinkling discharge water with a temperature equal to or higher than the set temperature at the sprinkling place reduces the possibility of frozen road surfaces. That is, when it is determined that the sprinkling mode is mode A, the external environment can be improved. As will be described later, when causing the vehicle 20 to sprinkle discharge water, the control unit 13 may cause the vehicle 20 to spray at least one of the antifreeze agent and the snow melting agent.

Fourth Example

The information indicating the environment of a sprinkling place may include the information indicating the observation or prediction of snow at the sprinkling place. In this example, when snow is observed or predicted at the sprinkling place, the control unit 13 may determine that the sprinkling mode is mode A. When it is determined that the sprinkling mode is mode A, the discharge water with a temperature equal to or higher than the set temperature can be sprayed at the sprinkling place. This configuration can melt the snow in the sprinkling place. The control unit 13 may receive the weather information in the same manner as in the first example to acquire the information indicating the observation or prediction of snow at the sprinkling place. When the vehicle 20 sprinkles discharge water, the vehicle 20 may spray at least one of the antifreeze agent and the snow melting agent in the same manner as in the third example.

Fifth Example

The information indicating the environment of a sprinkling place may include the information indicating the outside air humidity around the sprinkling place. In this example, when the outside air humidity around the sprinkling place is lower than a humidity threshold value, the control unit 13 may determine that the sprinkling mode is the spraying mode. The control unit 13 may receive the information indicating the outside air humidity around the sprinkling place from a hygrometer installed around the sprinkling place through the communication unit 11 via the network 2. The control unit 13 may receive the weather information in the same manner as in the first example to acquire the information indicating the outside air humidity around the sprinkling place.

The humidity threshold value may be appropriately set based on the effect of dried air on the external environment. The humidity threshold value may be appropriately set based on the volume of dust thought to be present in the air around the sprinkling place. When the air is dry, dust can easily fly. For example, the humidity threshold value is set to a value that is larger as the volume of dust in the air around the sprinkling place is larger.

When the outside air humidity around the sprinkling place is lower than the humidity threshold value, the control unit 13 determines that the sprinkling mode is the spraying mode. As a result, mist-like discharge water can be sprayed from the vehicle 20 at the sprinkling place. The dust flying in the air can absorb mist-like discharge water and then fall onto the road surface. Since the dust flying in the air falls onto the road surface in this way, the volume of dust in the air can be reduced. That is, the external environment can be improved.

Sixth Example

The information indicating the environment of a sprinkling place may include the information indicating the volume of dust on the sprinkling place. In this example, when the volume of dust on the sprinkling place is higher than a first volume threshold value, the control unit 13 may determine that the sprinkling mode is the dripping mode. The volume of dust on the sprinkling place may be the volume of dust on the road surface that is the sprinkling place. The control unit 13 may acquire the volume of dust on the sprinkling place based on the information on the wind speed observed or predicted on the ground. When the wind is strong, the dust carried by the wind can accumulate on the road surface. The dust may be at least one of soil dust, pollen such as cedar pollen, and yellow sand particles. The control unit 13 may receive the weather information in the same manner as in the first example to acquire the information on the wind speed observed or predicted on the ground. The first volume threshold value may be appropriately determined according to the type of dust. The first volume threshold value may be appropriately determined based on the load of dust on the human body.

When the volume of dust on the sprinkling place is higher than the first volume threshold value, the control unit 13 determines that the sprinkling mode is the dripping mode. As a result, discharge water can be dripped from the vehicle 20 onto the sprinkling place. Since the discharge water is dripped onto the sprinkling place, the possibility that dust on the sprinkling place will fly in the air can be reduced. That is, the external environment can be improved.

Seventh Example

The information indicating the environment of a sprinkling place may include the information indicating the volume of traffic of moving objects traveling in the sprinkling place. In this example, when the volume of traffic of moving objects traveling in the sprinkling place is less than a second volume threshold value, the control unit 13 may determine that the sprinkling mode is the dripping mode. The moving objects may be any vehicle capable of traveling on the road surface. The moving objects may include a motorcycle, a three-wheeled vehicle, a four-wheeled vehicle, and so on. The control unit 13 may receive, from at least one of the vehicles 20, the position information on the vehicle 20 and the traveling information on the vehicle 20 through the communication unit 11 via the network 2. The control unit 13 may estimate the volume of traffic of moving objects at the position of the vehicle 20 by analyzing the received position information on the vehicle 20 and the received traveling information on the vehicle 20.

The second volume threshold value may be appropriately set based on the volume of traffic on the road surface during traffic congestion. For example, the second volume threshold value is equal to or less than the volume of traffic on the road surface during traffic congestion. When a traffic congestion occurs, the road surface can become dirty due to the exhaust gas emitted from vehicles. When the discharge water of the vehicle 20 is dripped onto the sprinkling place, the road surface, which is the sprinkling place, is less likely to be contaminated by exhaust gas. That is, the external environment can be improved.

Vehicle Estimation Processing

The control unit 13 may estimate the vehicle 20 scheduled to travel in a sprinkling place from among the vehicles 20 included in the sprinkling system 1. The control unit 13 can receive the position information on the vehicle 20 from the vehicle 20 through the communication unit 11 via the network 2. Based on the position information on at least one of the vehicles 20 received by the communication unit 11, the control unit 13 may estimate, from among the vehicles 20 included in the sprinkling system 1, the vehicle 20 scheduled to travel in a sprinkling place.

When the information processing device 10 is a delivery server and the vehicle 20 is operated as a delivery vehicle, the control unit 13 can determine the delivery route of the vehicle 20 in advance. The control unit 13 can estimate the vehicle 20 scheduled to travel in a sprinkling place from among the vehicle 20 included in the sprinkling system 1, based on the predetermined delivery route of the vehicle 20 and on the current position information on the vehicle 20.

When the information processing device 10 is a vehicle dispatch server and the vehicle 20 is operated as a taxi, the control unit 13 can acquire the position information on the customer's pick-up place and the position information on the customer's drop-off place. In the vehicle dispatch service, the position information on the customer's pick-up place and the position information on the customer's drop-off place can be determined in advance before the customer takes a taxi. The control unit 13 may estimate the vehicle 20 scheduled to travel in a sprinkling place from among the vehicles 20 included the sprinkling system 1, based on the position information on the customer's pick-up place and the position information on the customer's drop-off place, both of which are predetermined, and on the current position information on the vehicle 20.

Sprinkling Mode Notification Processing

The control unit 13 may send, through the communication unit 11 via the network 2, a notification indicating a sprinkling mode to at least one of the vehicles 20 scheduled to travel in a sprinkling place. The notification indicating a sprinkling mode may be a notification indicating the spraying mode, a notification indicating the dripping mode, or a notification indicating mode A. Together with the notification indicating a sprinkling mode, the control unit 13 may send, to the vehicle 20, the position information on the sprinkling place and the notification instructing an instruction to sprinkle the discharge water of the vehicle 20. When the outside air temperature around the sprinkling place is lower than the third temperature threshold value or when snow is observed or predicted at the sprinkling place, the control unit 13 may send a notification indicating a sprinkling mode and a notification indicating an instruction to spray at least one of antifreeze agent and snow melting agent.

Compensation Determination Processing

When a notification indicating a sprinkling mode is sent to a plurality of the vehicles 20 each scheduled to travel in a sprinkling place, the control unit 13 may determine to give a preset compensation to the vehicle 20 that is among the plurality of vehicles 20 and has sprinkled discharge water using the sprinkling mode. The control unit 13 may receive, from the vehicle 20 through the communication unit 11 via the network 2, the information indicating the identifier of the vehicle 20 and the notification indicating that the vehicle 20 has sprinkled the discharge water. As will be described later, when the vehicle 20 has sprinkled the discharge water using the sprinkling mode determined by the information processing device 10, the notification indicating that the water has been sprinkled can be sent from the vehicle 20 to the information processing device 10. By receiving the notification that the water has been sprinkled, the control unit 13 can identify the vehicle 20 that has sprinkled water using the sprinkling mode determined by the information processing device 10. The preset compensation, if given to the vehicle 20 that has sprinkled water using the sprinkling mode determined by the information processing device 10, can encourage the driver of the vehicle 20 to positively sprinkle water using the sprinkling mode determined the information processing device 10. When the driver of the vehicle 20 positively causes the vehicle 20 to sprinkle the discharge water using the sprinkling mode determined by the information processing device 10, the external environment can be effectively improved.

When the information processing device 10 is a rental server and the vehicle 20 is operated as a rental vehicle, the compensation may be a discount on the rental fee of the vehicle 20. For example, when the information processing device 10 is a rental server that provides the lease or rental service of an FCV and the vehicle 20 is an FCV to be used for the lease or rental service, the compensation is a discount on the lease or rental fee. For example, when the information processing device 10 is a rental server that provides the car sharing service and the vehicle 20 is a shared vehicle, the compensation is a discount on the sharing fee of the vehicle 20. Such a configuration can encourage the user of the vehicle 20 in the rental service to positively cause the vehicle 20 to sprinkle discharge water using the sprinkling mode determined by the information processing device 10.

When the information processing device 10 is a vehicle dispatch server and the vehicle 20 is operated as a taxi, the compensation may be a reward for the driver of the vehicle 20. When the information processing device 10 is a delivery server and the vehicle 20 is operated as a delivery vehicle, the compensation may be a reward for the driver of the vehicle 20. Such a configuration can encourage the driver to positively cause the vehicle 20, which is a taxi, to sprinkle discharge water using the sprinkling mode determined by the information processing device 10.

As shown in FIG. 2, the vehicle 20 includes an electronic control unit (ECU) 21, a sprinkling device 30, and a control device 40. The vehicle 20 may further include a camera 22 and a camera 23. The ECU 21, camera 22, camera 23, sprinkling device 30, and control device 40 are communicably connected to each other.

The ECU 21 is a control unit that controls various devices mounted on the vehicle 20. The ECU 21 can output the traveling information on the vehicle 20 to the control device 40. The traveling information on the vehicle 20 may include at least one of the information on the average speed of the vehicle 20 and the information on the acceleration of the vehicle 20.

The camera 22 may be an infrared camera. The camera 22 can generate a thermal image by detecting infrared light that is electromagnetic waves propagating from a plurality of object points. When the vehicle 20 is located on the road surface, the camera 22 may be located where the thermal image of the road surface around the vehicle 20 can be generated. The camera 22 may also be located on the dashboard of the vehicle 20 or the like.

The camera 23 may be a visible light camera. The camera 23 can generate a captured image by detecting visible light that is electromagnetic waves propagating from a plurality of object points. When the vehicle 20 is located on the road surface, the camera 23 may be located where the captured image of the road surface around the vehicle 20 can be generated. The camera 23 may also be located on the dashboard of the vehicle 20 or the like.

The sprinkling device 30 sprinkles the discharge water of the vehicle 20 under the control of the control device 40. The sprinkling device 30 includes at least one tank 31, at least one discharge water tube 32, at least one valve 33, and at least one atomizer 34. The sprinkling device 30 may further include a sprayer. The sprayer can spray either antifreeze agent or a snow melting agent.

The tank 31 may be a container made of plastic, glass, metal, or the like. The discharge water of the vehicle 20 is stored in the tank 31.

In the present disclosure, "discharge water" may be the waste water produced by the vehicle 20. When the vehicle 20 is equipped with an air conditioner, the discharge water may be water generated by the air conditioner. When the vehicle 20 is a hydrogen-fueled FCV, the discharge water may be water generated in the FC stack. In the FC stack, water can be generated when hydrogen and oxygen are chemically reacted to generate electricity.

The tank 31 may be configured so that heat generated by the components mounted on the vehicle 20 is transferred to the discharge water stored in the tank 31. The tank 31 may be configured so that the temperature of the discharge water stored in the tank 31 is maintained at a temperature equal to or higher than a preset set temperature by the heat generated by the battery or motor of the vehicle 20. The set temperature may be appropriately determined depending on the structure of the battery or motor of the vehicle 20. The tank 31 may be located near the battery or motor of the vehicle 20 so that the temperature of the discharge water stored in the tank 31 is maintained at a temperature equal to or higher than the set temperature by the heat transferred from the battery or motor. In the description below, when the tank 31 is configured so that the temperature of the discharge water stored in the tank 31 is maintained at a temperature equal to or higher the set temperature by the heat generated by the battery or the motor, the tank 31 is also described as "a tank 31a". When the sprinkling device 30 includes a plurality of the tanks 31, some of the plurality of the tanks 31 may be tanks 31a.

The discharge water tube 32 may be a cylindrical member made of plastic, glass, metal, or the like. One end of the discharge water tube 32 is connected to the tank 31. When the sprinkling device 30 includes a plurality of the tanks 31 and a plurality of the discharge water tubes 32, one ends of the plurality of the discharge water tube 32 may be connected to the plurality of the tank 31, respectively. The other ends of the discharge water tubes 32 are exposed to the outside of the vehicle 20. When the vehicle 20 is located on the road surface, the other ends of the discharge water pipes 32 may face the road surface. In the description below, when one end of the discharge water tube 32 is connected to the tank 31a, the discharge water tube 32 is also described as "a discharge water tube 32a".

The valve 33 is attached to the discharge water tube 32. When the sprinkling device 30 includes a plurality of the discharge water tubes 32 and a plurality of the valves 33, the plurality of the valves 33 may be attached to the plurality of the discharge water tubes 32, respectively. The valve 33 may be a solenoid valve. The valve 33 opens and closes based on an electric signal received from the control device 40. In the description below, the valve 33 attached to the discharge water tube 32a is also described as "a valve 33a".

The atomizer 34 may be configured to include a piston, an electric pump, a nozzle, and the like. The atomizer 34 can eject the discharge water, stored in the tank 31, to the outside of the vehicle 20 in the mist form. When the electric signal is output from the control device 40 to the electric pump of the atomizer 34, the atomizer 34 ejects the discharge water of the tank 31 to the outside of the vehicle 20 in the mist form.

The control device 40 causes the sprinkling device 30 to sprinkle water. The control device 40 includes a communication unit 41, a positioning unit 42, an input unit 43, a display unit 44, a storage unit 45, and a control unit 46. The storage unit 45 and the control unit 46 may be a part of the ECU 21.

The communication unit 41 may be configured to include at least one communication module that can be connected to the network 2. For example, the communication module is a module that supports mobile communication standards such as Long Term Evolution (LTE) standard, 4th Generation (4G) standard, or 5th Generation (5G) standard.

The positioning unit 42 can acquire the position information on the vehicle 20. The positioning unit 42 outputs the position information on the vehicle 20 to the control unit 46. The positioning unit 42 may be configured to include the Global Positioning System (GPS) receiving module.

The input unit 43 can accept an input from the user. The input unit 43 may be configured to include at least one input interface capable of accepting an input from the user. The input interface may be physical keys, capacitive keys, a pointing device, a touch screen integrated with a display, a microphone, etc. The input unit 43 may be provided in the control device 40, or may be connected to the control device 40 as an external input device. When connected to the control device 40 as an external input device, the input unit 43 may be connected to the control device 40 using any connection method. Examples of connection methods include Universal Serial Bus (USB), High-Definition Multimedia Interface (registered trademark) (HDMI), and Bluetooth (registered trademark).

The display unit 44 can display any information. The display unit 44 may be configured to include a display. The display may be a liquid crystal display (LCD), an organic electro luminescence (EL) display, or the like. The display unit 44 may be provided in the control device 40 or may be connected to the control device 40 as an external output device. When connected to the control device 40 as an external output device, the display unit 44 may be connected to the control device 40 using any connection method. Examples of connection methods include USB, HDMI (registered trademark), and Bluetooth (registered trademark).

The storage unit 45 is configured to include at least one semiconductor memory, at least one magnetic memory, at least one optical memory, or a combination of at least two types of these memories in the same manner as the storage unit 12. The storage unit 45 may function as a main storage device, an auxiliary storage device, or a cache memory. The storage unit 45 stores the data used for the operation of the control device 40 and the data obtained by the operation of the control device 40.

The control unit 46 may be configured to include at least one processor, at least one dedicated circuit, or a combination of them in the same manner as the control unit 13. The control unit 46 can perform the processing related to the operation of the control device 40 while controlling the components of the control device 40.

The function of the control device 40 is implemented by causing the processor, corresponding to the control unit 46, to execute the control program according to this embodiment. That is, the function of the control device 40 is implemented by software. The control program causes the computer to function as the control device 40 by causing the computer to perform the operation of the control device 40. That is, the computer functions as the control device 40 by performing the operations of the control device 40 according to the control program.

Apart of or all of the functions of the control device 40 may be implemented by a dedicated circuit corresponding to the control unit 46. That is, a part of or all of the functions of the control device 40 may be implemented by hardware.

Processing for Sending Various Types of Information

The control unit 46 may acquire the position information on the vehicle 20 by the positioning unit 42 at a preset time interval. The control unit 46 may send the position information on the vehicle 20 to the information processing device 10 through the communication unit 41 via the network 2 at the time interval. The time interval may be appropriately set, for example, based on the average speed of the vehicle 20.

The control unit 46 may acquire thermal image data, generated by the camera 22, at a preset time interval. The control unit 46 may send the thermal image data to the information processing device 10 through the communication unit 41 via the network 2 at the time interval. The time interval may be appropriately set, for example, based on the average speed of the vehicle 20. The control unit 46 may send the thermal image data, generated by the camera 22, to the information processing device 10 while the vehicle 20 is stopped.

The control unit 46 may acquire captured image data, generated by the camera 23, at a preset time interval. The control unit 46 may send the captured image data to the information processing device 10 through the communication unit 41 via the network 2 at the time interval. The time interval may be appropriately set, for example, based on the average speed of the vehicle 20. The control unit 46 may send the captured image data, generated by the camera 23, to the information processing device 10 while the vehicle 20 is stopped.

The control unit 46 may acquire the traveling information on the vehicle 20 from the ECU 21 at a preset time interval. The control unit 46 may send the traveling information on the vehicle 20 to the information processing device 10 through the communication unit 41 via the network 2 at the time interval. The time interval may be appropriately set, for example, based on the average speed of the vehicle 20.

Sprinkling Processing

The control unit 46 can receive a notification indicating a sprinkling mode from the information processing device 10 through the communication unit 41 via the network 2. When the notification indicating a sprinkling mode is received, the control unit 46 causes the sprinkling device 30 to sprinkle the discharge water of the vehicle 20 as described in the examples below.

First Example

When a notification indicating a sprinkling mode is received from the information processing device 10, the control unit 46 may cause the display unit 44 to display the sprinkling mode. For example, in response to the notification indicating the sprinkling mode that has been received, the control unit 46 causes the display unit 44 to display one of the display indicating the spraying mode, the display indicating the dripping mode, and the display indicating mode A. The driver of the vehicle 20 can visually recognize the sprinkling mode, displayed on the display unit 44, to know the sprinkling mode notified from the information processing device 10 to the vehicle 20. When sprinkling the discharge water of the vehicle 20, the driver can enter an input indicating the instruction to sprinkle water and an input specifying a sprinkling mode from the input unit 43. The input specifying a sprinkling mode may be one of the input specifying the spraying mode, the input specifying the dripping mode, and the input specifying mode A.

From the information processing device 10, the control unit 46 can receive the notification indicating the sprinkling mode and, at the same time, the position information on the sprinkling place and the notification indicating the instruction to sprinkle the discharge water of the vehicle 20. In this case, the control unit 46 may cause the display unit 44 to display the sprinkling mode and, at the same time, the instruction to sprinkle the discharge water of the vehicle 20 and the position information on the sprinkling place. By visually recognizing the sprinkle instruction displayed on the display unit 44, the driver of the vehicle 20 can know that the instruction to sprinkle the discharge water of the vehicle 20 has been issued from the information processing device 10 to the vehicle 20. In addition, by visually recognizing the sprinkling place displayed on the display unit 44, the driver of the vehicle 20 can recognize the sprinkling place. Therefore, when the vehicle 20 arrives at the sprinkling place, the driver of the vehicle 20 can enter, from the input unit 43, an input indicating the instruction to sprinkle water.

The control unit 46 can accept an input indicating the instruction to sprinkle water, and an input specifying the sprinkling mode, from the input unit 43. When these inputs are accepted, the control unit 46 causes the sprinkling device 30 to sprinkle discharge water.

For example, when the input specifying the sprinkling mode entered from the input unit 43 is an input specifying the spraying mode, the control unit 46 outputs the electric signal to the electric pump of the atomizer 34. The control unit 46 outputs the electric signal to the electric pump of the atomizer 34 to cause the atomizer 34 to eject the discharge water of the tank 31 to the outside of the vehicle 20 in the mist form. The number of times the atomizer 34 ejects the mist-like discharge water may be appropriately set according to the amount of discharge water ejected from the atomizer 34 at a time and the amount of discharge water that can be sprinkled from the tank 31 at a time.

For example, when the input specifying the sprinkling mode entered from the input unit 43 is an input specifying the dripping mode, the control unit 46 outputs the electric signal to the valve 33 to open the valve 33. When the valve 33 is opened, a part of the discharge water stored in the tank 31 is dripped to the outside of the vehicle 20, such as the road surface, via the discharge water tube 32. After a preset set time elapses, the control unit 46 outputs the electric signal to the valve 33 to close the valve 33. The set time may be appropriately set according to the amount of discharge water that can be sprinkled from the tank 31 at a time.

For example, when the input specifying the sprinkling mode entered from the input unit 43 is an input specifying mode A, the control unit 46 outputs the electric signal to the valve 33a to open the valve 33a. When the valve 33a is opened, a part of the discharge water stored in the tank 31 and has a temperature equal to or higher than the set temperature is dripped onto the outside of the vehicle 20, such as the road surface, via the discharge water tube 32a. After the above-mentioned set time elapses, the control unit 46 outputs the electric signal to the valve 33a to close the valve 33a.

When causing the sprinkling device 30 to sprinkle the discharge water using the dripping mode, the control unit 46 may cause the sprinkling device 30 to drip an amount of discharge water according to the speed of the vehicle 20. The control unit 46 may acquire the speed information on the vehicle 20 from the ECU 21. The control unit 46 may control the amount of discharge water dripped from the vehicle 20 by the sprinkling device 30 so that less discharge water is dripped as the vehicle 20 travels faster. When less discharge water is dripped from the vehicle 20 as the vehicle 20 travels faster, it is possible to reduce the possibility that the discharge water dripped from the vehicle 20 will scatter.

The control unit 46 may receive, from the information processing device 10, a notification indicating mode A and a notification indicating the instruction to spray at least one of antifreeze agent and melting agent. In this case, when an input specifying mode A is accepted by the input unit 43, the control unit 46 may output the electric signal to the valve 33*a* to open the valve 33*a* and, at the same time, may cause the sprayer, included in the sprinkling device 30, to spray one of antifreeze agent and melting agent.

Second Example

When a notification indicating a sprinkling mode is received from the information processing device 10, the control unit 46 may automatically cause the sprinkling device 30 to sprinkle discharge water using the sprinkling mode indicated by the notification, that is, the sprinkling mode determined by the information processing device 10. When a notification indicating the instruction to spray at least one of antifreeze agent and melting agent is received from the information processing device 10, the control unit 46 may automatically cause the sprayer, included in the spreading device 30, to spray one of antifreeze agent or antifreeze agent. In addition, when the position information on a sprinkling place is received from the information processing device 10 and when the vehicle 20 is driven autonomously at a preset autonomous driving level, the control unit 46 may control the driving of the vehicle 20 so that the sprinkling place, the position of which has been received, is included in the scheduled traveling route of the vehicle 20. When the vehicle 20 arrives at the sprinkling place, the control unit 46 may cause the sprinkling device 30 to sprinkle discharge water using the sprinkling mode determined by the information processing device 10.

For example, when the information processing device 10 is a delivery server and when the vehicle 20 used as a delivery vehicle is autonomously driven at any autonomous driving level, the control unit 46 may adjust the delivery route so that the sprinkling place, the position of which is received from information processing device 10, is included in the delivery route of the vehicle 20. When the vehicle 20 arrives at the sprinkling place, the control unit 46 may cause the sprinkling device 30 to sprinkle discharge water using the sprinkling mode determined by the information processing device 10.

Sprinkling Notification Processing

The control unit 46 can cause the sprinkling device 30 to sprinkle discharge water using the sprinkling mode indicated in the notification received from the information processing device 10, that is, using the sprinkling mode determined by the information processing device 10. After that, the control unit 46 may send the information indicating the identifier of the vehicle 20, and the notification notifying that the discharge water has been sprinkled, to the information processing device 10 through the communication unit 41 via the network 2.

System Operation

Figure 3:
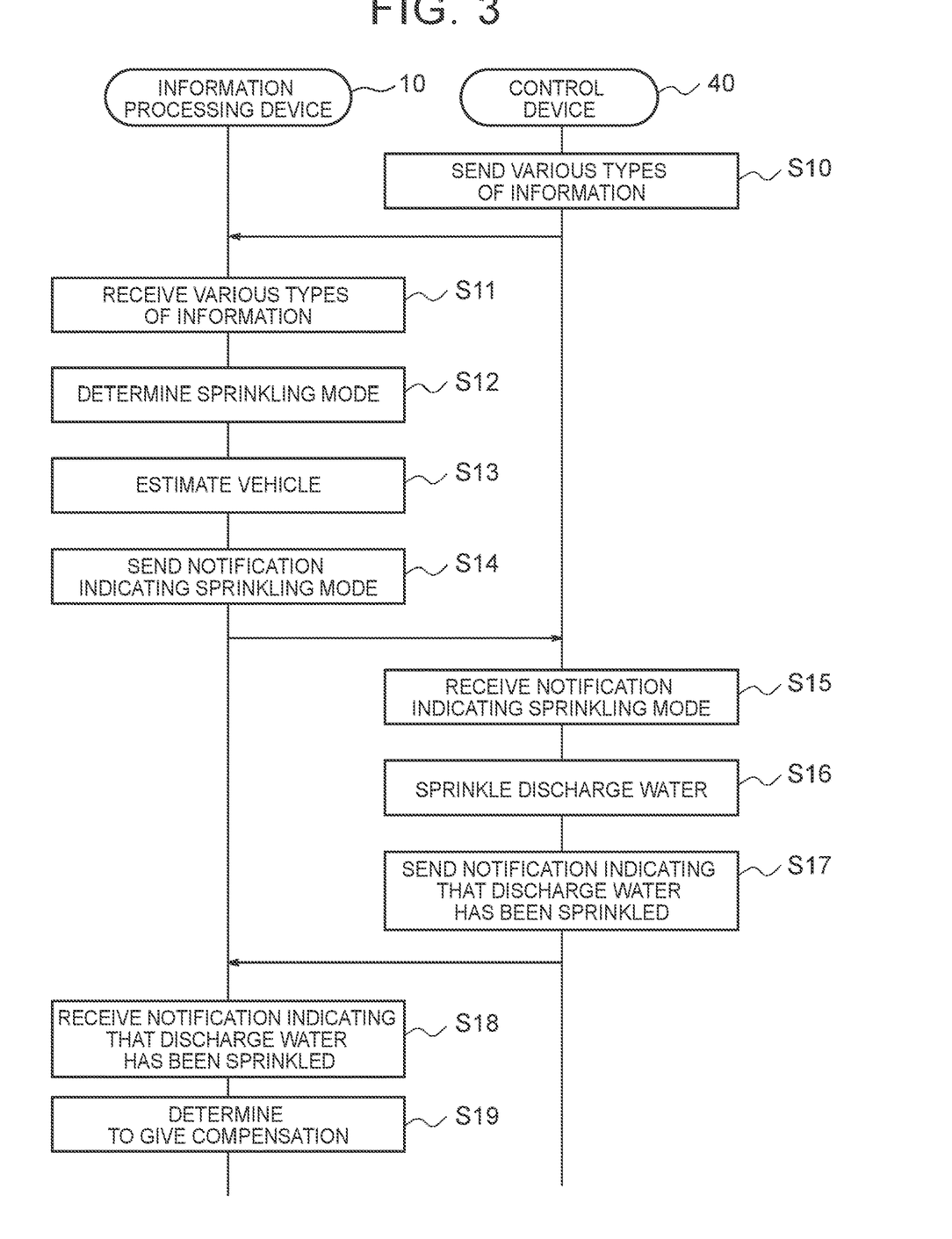
FIG. 3 is a sequence diagram showing an example of the operation of the sprinkling system shown in FIG. 1.

An example of the operation of the sprinkling system 1 shown in FIG. 1 will be described with reference to FIG. 3. This operation corresponds to an example of the sprinkling method according to this embodiment.

In the control device 40, the control unit 46 sends various types of information to the information processing device 10 through the communication unit 41 via the network 2 (step S10). The various types of information may include at least one of the position information on the vehicle 20, the thermal image data generated by the camera 22, the captured image data generated by the camera 23, and the traveling information on the vehicle 20.

In the information processing device 10, the control unit 13 receives the various types of information from the control device 40 through the communication unit 11 via the network 2 (step S11). The control unit 13 determines the sprinkling mode based on the information indicating the environment of the sprinkling place (step S12). The control unit 13 estimates the vehicle 20 scheduled to travel in the sprinkling place (step S13). The control unit 13 sends a notification indicating the sprinkling mode, determined in the processing in step S12, to the vehicle 20, scheduled to travel in the sprinkling place, through the communication unit 11 via the network 2 (step S14).

In the control device 40, the control unit 46 receives the notification indicating the sprinkling mode from the information processing device 10 through the communication unit 41 via the network 2 (step S15). The control unit 46 causes the sprinkling device 30 to sprinkle discharge water using the sprinkling mode indicated in the notification received from the information processing device 10 (step S16). The control unit 46 sends the information indicating the identifier of the vehicle 20, and the notification indicating that the discharge water of the vehicle 20 has been sprinkled, to the information processing device 10 through the communication unit 41 via the network 2 (Step S17).

In the information processing device 10, the control unit 13 receives the information indicating the identifier of the vehicle 20, and the notification indicating that the discharge water of the vehicle 20 has been sprinkled, from the vehicle 20 through the communication unit 11 via the network 2 (step S18). When the control unit 13 has sent a notification to instruct a plurality of vehicles 20, scheduled to travel in the sprinkling place, to sprinkle water, the control unit 13 determines to give a preset compensation to the vehicles that are among the plurality of vehicles 20 and that have sprinkled water (step S19).

In this way, in the sprinkling system 1, the information processing device 10 determines the sprinkling mode based on the information indicating the environment of a sprinkling place. In addition, the vehicle 20 sprinkles the discharge water of the vehicle 20 at the sprinkling place using the sprinkling mode determined by the information processing device 10. This configuration allows the vehicle 20 to sprinkle discharge water as described above, improving the external environment.

The present disclosure is not limited to the above embodiment. For example, the plurality of blocks included in the block diagram may be integrated or one block may be divided into a plurality of blocks. In addition, instead of performing the steps shown in the flowchart in chronological order according to the description, the steps may be performed in parallel, or in a different order, as necessary depending on the processing capability of the device that performs the steps. Other changes may be made without departing from the spirit of the present disclosure.

For example, in the description of the embodiment above, the information processing device 10 determines the sprinkling mode. Instead of this, the control device 40 may determine the sprinkling mode. In this case, from another vehicle 20 that is located near the vehicle 20 equipped with the control device 40, the control unit 46 of the control device 40 may receive, through the communication unit 41, the thermal image data generated by the camera 22 of the other vehicle 20. The communication between the vehicle 20 equipped with the control device 40 and the other vehicle 20 may be vehicle-to-vehicle communication. The communication unit 41 may include a communication module that supports vehicle-to-vehicle communication. The other vehicle 20 may be a vehicle that is stopped. The control unit 46 may analyze the thermal image data, acquired from the other vehicle 20, to estimate the surface temperature of the sprinkling place, or the outside air temperature around the sprinkling place, as the information indicating the environment of the sprinkling place. Based on the estimated surface temperature of the sprinkling place and the like, the control unit 46 may determine the sprinkling mode.

What is claimed is:

1. A control device comprising a control unit configured to cause a sprinkling device to sprinkle discharge water at a sprinkling place, using a sprinkling mode determined based on information indicating an environment of the sprinkling place,
wherein when the sprinkling mode is a mode in which discharge water with a temperature equal to or higher than a preset set temperature is sprinkled, the control device is configured to cause the sprinkling device to sprinkle discharge water maintained at a temperature equal to or higher than the preset set temperature by heat generated by a battery of a vehicle or generated by a motor of a vehicle.

2. A vehicle comprising:
the control device according to claim 1; and
the sprinkling device.

3. The vehicle according to claim 2, wherein, when the sprinkling mode is a dripping mode, the control device is configured to cause the sprinkling device to drip an amount of discharge water according to a speed of the vehicle.

4. The vehicle according to claim 2, wherein:
the vehicle is driven autonomously at a preset level; and
the control unit is configured to control driving of the vehicle so that the sprinkling place is included in a route on which the vehicle is scheduled to travel.

5. The vehicle according to claim 2, wherein the discharge water is generated by an air conditioner mounted on the vehicle.

6. The vehicle according to claim 2, wherein:
the vehicle is a fuel cell vehicle (FCV); and
the discharge water is generated in an FC stack of the vehicle.

* * * * *